United States Patent

[11] 3,596,831

[72] Inventor William P. Parmer
Fort Lauderdale, Fla.
[21] Appl. No. 843,657
[22] Filed July 22, 1969
[45] Patented Aug. 3, 1971
[73] Assignees Data Research Corporation;
Computer Utilities Corporation
Fort Lauderdale, Fla., part interest to each

[54] PUNCHED CARD VERIFIER ADAPTER
9 Claims, 3 Drawing Figs.

[52] U.S. Cl. .......... 234/34, 234/64, 234/124
[51] Int. Cl. .......... G06k 1/16
[50] Field of Search .......... 234/34, 64, 124

[56] References Cited

UNITED STATES PATENTS

| | | | |
|---|---|---|---|
| 2,080,192 | 5/1937 | Youngberg .......... | 234/34 |
| 2,625,225 | 1/1953 | Wockenfuss .......... | 234/34 |
| 2,654,432 | 10/1953 | Doty .......... | 234/34 X |

*Primary Examiner*—William S. Lawson
*Attorneys*—William D. Hall, Elliott I. Pollock, Fred C. Philpitt, George Vande Sande, Charles F. Steininger and Robert R. Priddy

ABSTRACT: A control unit is added to a standard card punch for permitting the punch to operate in either of two modes, i.e., its conventional punch mode, or a verify mode wherein information previously punched on a card is compared with information which the operator keys into the card punch keyboard. If the keyboard and card-punched data do not agree, an error light is energized, the machine is caused to stop, and the keyboard locks up. The read head normally provided in the card punch for duplicating operations is used during the verify mode to read previously punched information from a card for comparison with information keyed into the keyboard.

INVENTOR

William P. Parmer

BY

ATTORNEY

INVENTOR
William P. Parmer
BY
Elliott I. Pollock
ATTORNEY

PUNCHED CARD VERIFIER ADAPTER

BACKGROUND OF THE INVENTION

The construction and operation of card punches is, in itself, well known. Such punches comprise a relatively large and expensive piece of electromechanical equipment designed to receive a deck of unpunched cards, and adapted to feed such cards one by one in a step by step operation past a card punch head operated under the control of a keyboard. In normal operation, information entered into the keyboard produces signals which control the punch head to punch holes in the card as it moves step by step under the punches. Such equipment, moreover, normally includes a read head spaced from the punch head and arranged to couple signals back to the punch head during a "duplicate" mode of operation, so that certain information which is to be punched in common into a plurality of cards can be automatically duplicated on such a plurality of cards without requiring separate manual entries of the desired information into the keyboard.

Card-punching equipment of the type described above is, moreover, often associated with a separate verifier unit designed to receive previously punched cards and operating to check whether information punched into the cards is in fact correctly punched, or whether an error has been made during an earlier punching operation. Such verifier units are separate and distinct from the card punch itself, and are again relatively large and expensive pieces of equipment. A complete card punch and verifier installation thus normally requires that two relatively expensive pieces of equipment (each of which is comparable in cost to the other) be utilized, and that sufficient space be present to permit proper installation and operation of these two different pieces of equipment. These considerations have imposed severe limitations on data processing and verification operations since, in many cases, operators have been unable to afford the two machines normally considered necessary for a complete installation, due to money or space limitations.

The present invention is intended to avoid such money and space limitations through use of an adapter or converter control unit arranged to be added to a conventional card punch and designed to expand the capabilities of the card punch so that it cannot only punch a deck of computer cards, but can also verify that the data has been punched correctly. The added control unit is far less costly than a separate card punch verifier, and is also physically small and capable of being mounted directly on a preexisting card punch without imposing any extra space requirements. Addition of the adapter unit of the present invention thus expands the usefulness of a preexisting card punch by allowing a single machine to perform the task which has, up to the present time, been done by two separate machines.

SUMMARY OF THE INVENTION

The punch card verifier adapter of the present invention comprises a relatively small unit adapted to be electrically connected to a preexisting card punch and designed to enable the operator of the equipment to punch and/or verify a deck of cards on a single machine. Addition of the adapter unit to a standard card punch causes the card punch to exhibit two modes of operation. In the first or "punch" mode, the equipment operates in its normal fashion. However, in the second or "verify" mode, information previously punched onto a card is compared with information that the operator keys into the keyboard to determine whether the previously punched information is correct.

To effect this comparison, the adapter unit functions to disconnect the punch solenoids, and operates to monitor signals provided by the duplicate read head and by the keyboard of the equipment. During the verify operation, a card to be verified is positioned for feeding past the read head, and the information which should be present on the card is manually placed into the keyboard. The output signals from the keyboard are compared with signals read by the duplicate read head to effect the desired verifying operation. If the keyboard and punched data do not agree, an error light is lit, the machine is caused to stop, and the keyboard locks up. At this point, the operator can clear the error by depressing an error reset button on the punched card verifier adapter, and then can rekey the information. The adapter is designed to permit such rekeying of information a plurality of times; and if, after, for example, three attempts at verification, no verification can be achieved, the keyboard locks up in a fashion which cannot be cleared by depression of the error reset button. At this point, the operator marks the card as being bad, depresses a separate error skip button, and continues to check the rest of the cards. The error skip button, unlike the error reset button which clears the keyboard and leaves the same data under the read head, clears the keyboard and skips the card to the next column.

The punch card verifier adapter allows a conventional card punch to perform all operations which a conventional verifier can perform, except for automatically marking a card when an error is detected, automatically verifying one card against another, and verifying a multiple punch operation. The punch card verifier adapter has a mode select switch that allows the operator to operate the card punch in conventional fashion, or as a punch card verifier. The mode selection switch is intended to selectively break into preexisting wiring of the card punch, and to bring out the sequence control relays, the keyboard control lines to the interposer magnets, and the read head control lines to the interposer magnets. These lines are brought to a male and female pair of 36 pin connectors which plug into the punch card verifier adapter when it is used. If for any reason the card punch should fail, these connectors can be removed from the punch card verifier adapter and mated together. This returns the card punch to the electrical configuration which existed without the connectors so that the card punch can be serviced in normal fashion. The mode select switch operates, when the equipment is in its normal or "-punch" mode, to route signals through their conventional paths. In the "verify" mode, however, the mode select switch operates to route some of the card punch signals through the adapter unit, and then back out again to the card punch.

In the verify mode, the mode select switch routes the 13 interposer magnet control lines, the 13 card reader lines, the escape magnet control lines, the escape interlock relay control lines, the keyboard clear control lines, the strobe cam line, and the keyboard key common into the punch card verifier adapter. When any one of the keys of the keyboard is punched, a start signal is generated by applying a positive voltage to the keyboard key common line which fires the escape interlock driver. This enables the escape interlock relay in the punch, causing the punch clutch to actuate and rotate the punch cylinder. Rotation of the punch cylinder causes the pin contacts on the card reader to read the punched card information. At the same time that the card is read, the strobe cam line is enabled. At this time, a unique combination of punch interposer magnet lines is also enabled.

By use of the mode switch, the decoded keyboard lines are disconnected from the interposer magnets and applied to the inputs of a comparator. The 13 punch interposer magnet control lines are a decode of the card punch keyboard, and a unique combination of each of these lines is enabled for each character on the keyboard. Each interposer magnet has a corresponding read contact on the card punch read head. Therefore, a comparison of what has been punched on the card and what the keyboard is reading can be made by comparing the signals on the interposer control lines from the read head with the signals on the interposer control lines from the keyboard at a given time. If, upon making such a comparison, an error is detected, an error lamp is lit, an error latch is set to lock up the keyboard, and a count is fed into an error counter. Pushing an error clear button then clears the latch and activates the keyboard clear logic in order that a comparison can be tried once more on the same column. If, after three attempts to achieve verification on a single column, no verification can be effected, the error counter disables the error clear logic so that the keyboard can no longer be released by the error clear button. At this time, verification can continue by depression of an error skip button which clears the keyboard latch to restore the keyboard, but which also actuates the escape magnet driver to advance the card to the next column.

DESCRIPTION OF THE PREFERRED EMBODIMENTS

The verifier adapter of the present invention may be used with various commercially available card punch machines such as the IBM Models 024, 026, and 029. The system to be described hereinafter will be described with reference to the IBM Model 024 punch machine; but it will be understood by those skilled in the art that the principles to be described apply equally to other commercially available equipments, and that the adapter of the present invention may accordingly be employed in conjunction with such other equipments so long as the adapter is appropriately interconnected to the preexisting wiring of such other apparatuses.

The standard IBM card punch is an electromechanical device that derives its timing and sequence control from relays that are controlled by gears and cams. In order to convert the IBM card punch to a composite card punch and verifier machine, one must break into the wiring of the punch and bring out the sequence control relays, the keyboard control lines to the interposer magnets, and the read head control lines to the interposer magnets. In effect, the circuits normally provided between the keyboard, duplicate reading head, and punches are selectively interrupted to prevent the keyboard and read head output lines from operating the punches; and the keyboard and read head outputs are, instead, coupled to a comparator device comprising a portion of the punched card verifier adapter. The output of the comparator device is in turn employed to give an indication of error during the verify mode of operation, e.g. by energizing an appropriate lamp and/or locking up the keyboard. Moreover, inasmuch as various circuits must be interrupted to convert the standard equipment from its punch mode of operation to a verify mode of operation, the verifier adapter must also include means for routing various control signals through the verifier unit to permit the machine to operate to advance a card, etc. These aspects of the system will become more readily apparent subsequently.

Figure 1:
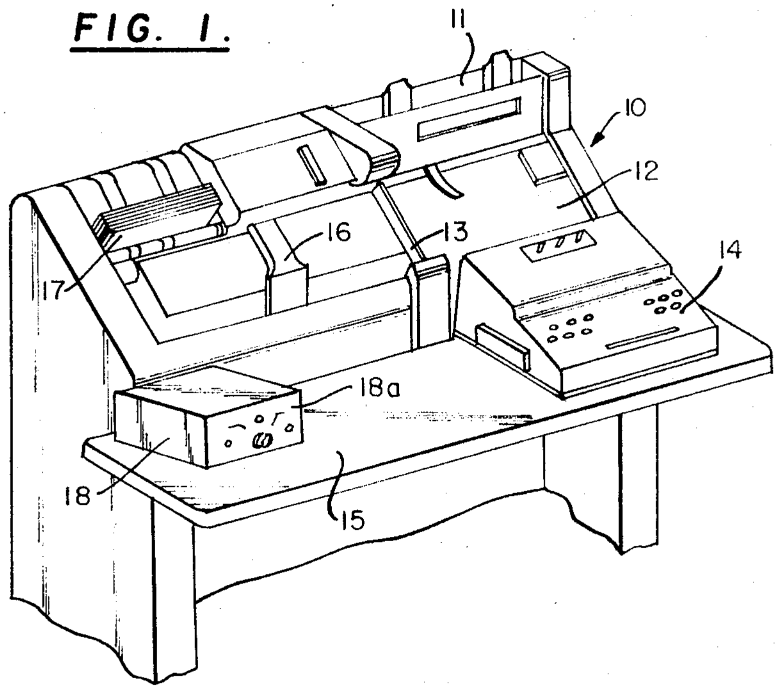
FIG. 1 is a perspective view of a standard card punch and added adapter unit in accordance with the present invention.
Figure 1A:
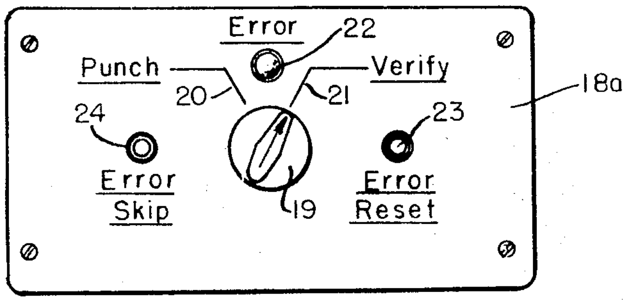
FIG. 1A illustrates the control panel of the adapter unit.

FIG. 1 illustrates a commercially available IBM card punch 10. This equipment, in itself well known, comprises a card hopper 11 associated with appropriate feeding means for feeding an unpunched card to a card bed 12 and thence, in a right to left direction, past a card-punching station 13. Punching station 13 is controlled inter alia by means of a keyboard 14 supported on a reading board 15 for perforating the card as it is advanced past punching station 13. A reading station or read head 16 is positioned one card length to the left of the punching station 13. Reading station 16 is normally provided for duplicating purposes, and each card which has been punched passes through the reading station as the next card is being punched. As a card moves past the reading station in synchronism with movement of a card past the punching station, information to be duplicated from the card at the reading station can be transferred onto the card at the punching station. Following its passage through reading station 16, each card is fed automatically into a stacker 17.

In accordance with the present invention, the commercially available equipment described above is modified through the addition of a control unit 18 which can be placed as shown on reading board 15. Control unit 18 includes a control panel **18*a* provided with a two-position switch 19 selectively movable between a "punch" (or "P") position 20 and a "verify" (or "V") position 21. Switch 19 is the so-called mode switch, and operates a plurality of ganged movable contacts 19*a*—19*g* inclusive (shown in FIG. 2) each of which is adapted to mate with either a P or V fixed contact in the "punch" and "verify" operation modes respectively. The adapter unit control panel 18*a* includes, in addition, an error lamp 22, an error reset button 23, and an error skip button 24. These elements 22—24** are also shown in FIG. 2; and their function will be discussed subsequently.

Figure 2:
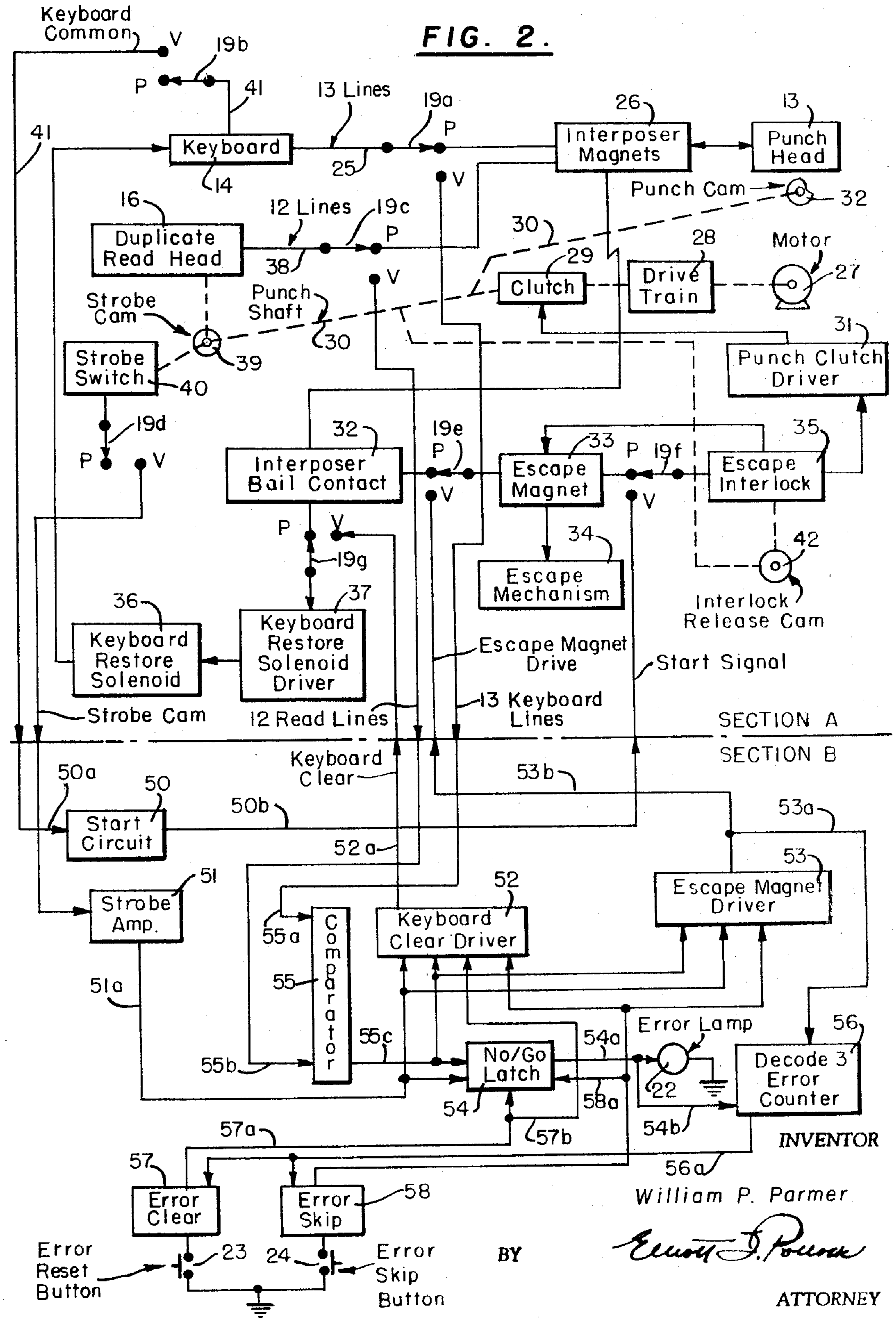
FIG. 2 is a block diagram of the interconnected card punch and adapter unit.

FIG. 2 illustrates the main components of a standard card punch of the type described, along with the card punch verifier of the present invention and the interconnections between these two units effected by the mode switch 19. FIG. 2 is divided into two main parts designated "section A" (above a horizontal broken line) and "section B" (below the aforementioned broken line). Section A represents in simplified block diagram form an IBM card punch of commercially available type with the verifier adapter mode switch contacts **19*a*—19*g*** added at the major breakpoints in the card punch circuitry. Section B is a block diagram of the punched card verifier adapter of the present invention. The interface lines of the adapter are connected to the verify position (contacts V) of the mode switch.

As illustrated in FIG. 2, the standard card punch may comprise a keyboard 14 which takes the form of a standard IBM punch keyboard containing numeric and/or alphanumeric characters. 13 keyboard interposer magnet control lines 25 are coupled from keyboard 14 to the 13 interposer magnets 26 of the card punch. In operation, grounding of any one such control line 25 energizes an associated interposer magnet 26. 12 of the 13 interposer magnets 26 control 12 hole punches of the punch head 13. The 13th interposer magnet controls the space operation of the punch.

Power for the punching operation is derived from a motor 27 coupled via a drive train 28 and clutch 29 to a punch shaft 30. Punch shaft 30 contains a series of cams that control the sequence of operation of the punch cycle. Punch clutch 29 connects drive train 28 to the punch shaft for one cycle of the punch operation; and clutch 29 is selectively enabled by means of a punch clutch driver 31. When the clutch 29 is enabled to rotate shaft 30, the punch head 13 is actually driven through the agency of a punch cam 32.

Whenever any one of the interposer magnets 26 is energized, a mechanical switch, designated the interposer bail contact 32, is closed. Switch 32 is coupled to an escape magnet 33 comprising an electromechanical device which withdraws a pawl from an escape ratchet allowing an escape mechanism 34 to move. Mechanism 34 in turn comprises a series of motor-driven clutches, gears, and a roller operative to move the card under the punch head 13 and/or under the read head 16. An escape interlock 35 is also provided, and comprises an electromechanical relay which controls the escape magnet 33 to assure that the escape mechanism 34 moves the card only one column at a time. A mechanical lock is placed on the keyboard 14 any time that a key is depressed; and this lock is removed by a keyboard restore solenoid 36 which is in turn controlled by a keyboard restore solenoid driver 37 coupled to the output of the interposer bail contact 32.

The duplicate read head 16 comprises an electromechanical device located, as described earlier, to the left of the punch head 13; and head 16 contains 12 reader contacts for detecting holes in a previously punched card. These contacts are used to control the interposer magnets 26 during a duplicate operation of the card punch. More particularly, the read head 16 is coupled via 12 lines 38 to the interposer magnets 26; and grounding of any one of the lines 38 energizes the associated interposer magnet 26. A strobe cam 39 mounted on the punch shaft 30 energizes the duplicate read head 16 before the punch cam 32 comes true; and a strobe switch 40 is mechanically closed when the strobe cam 39 comes true.

The electrical wiring normally provided in the standard equipment described above is broken at selected points by the mode switch 19 to permit the standard equipment to exhibit a verify mode as well as its normal punch mode. Mode switch 19 includes a switch blade 19a which selectively interrupts the 13 lines 25 from the output of keyboard 14 to the interposer magnets 26 and which, instead, couples the 13 lines 25 to the verifier adapter. An additional switch blade 19b selectively couples the keyboard common 41 to the verifier adapter. Switch blade 19c selectively interrupts the coupling between the duplicate read head 16 and interposer magnets 26, and, instead, selectively couples the 12 lines 38 to the verifier adapter. Switch blade 19d selectively connects the strobe switch 40 to the verifier adapter. Switch blade 19e selectively interrupts the coupling between the interposer bail contact 32 and escape magnet 33 and, instead, couples the escape magnet 33 to the adapter. Similarly, switch blade 19f selectively interrupts the coupling between escape interlock 35 and escape magnet 33 and, instead, couples the escape interlock 35 to the adapter. Switch blade 19g interrupts the connection between interposer bail contact 32 and driver 37 and, instead, couples an output line from the verifier adapter to the keyboard restore solenoid driver 37. When the several ganged switch blades 19a—19g are in their P-positions, all connections between the described portions of the card punch are identical to those which are normally present in the standard card punch equipment; but when the switch blades are moved to their V-positions, the wiring is interrupted as described so that the punch equipment can now operate in a verify mode.

Before describing the verifier adapter of the present invention, and its cooperation with the standard punch in the verify mode, let us first consider the operation of the card punch itself with the mode switch sections 19a—19g all in their P-positions. When a key on the keyboard 14 is depressed, a unique combination of the 13 control lines 25 to the interposer magnets 26 are enabled, pulling in the corresponding interposer magnets 26. Any time one of the interposer magnets 26 is pulled in, the interposer bail contact 32 is set by a mechanical action caused by the interposer magnets. The setting of the interposer bail contact 32 does two things. It enables the keyboard restore solenoid driver 37, which in turn drives the keyboard restore solenoid 36 to clear the keyboard 14. In addition, setting of the interposer bail contact 32 energizes the escape magnet 33. Escape magnet 33 actuates the escape mechanism 34 which allows the card being punched to move one space under the punch head 13.

Escape interlock 35 feeds back to the escape magnet 33 to turn it off so that the card will advance only one space. Escape interlock 35 prevents escape magnet 33 from energizing again until the next punch cycle. In addition, escape interlock 35 energizes the punch clutch driver 31 which engages the clutch 29 to cause the punch shaft 30 to rotate. Punch cam 32 on punch shaft 30 causes the card to be punched by those punches in the punch head 13 whose interposer magnets 26 have been engaged. The return travel of the punches disengages the interposer magnets 26 to ready them for the next punch cycle. Rotation of punch shaft 30 also causes an interlock release cam 42 to disengage the escape interlock 35 after the punching is complete.

When the card punch equipment is in its "duplicate" mode, rotation of the punch shaft 30 operates the strobe cam 39 to cause the duplicate read head 16 to read a card under the read head before the punch cam 32 engages the punches. In the "duplicate" mode, the action of the card punch is identical to that in the manual punch mode of the equipment, except that the interposer magnets 26 are controlled by the duplicate read head 16 rather than by the keyboard 14. Thus, in the "duplicate" mode, the equipment operates to punch a card under the punch head 13 with the same data present on a card under the read head 16, column for column. Due to the fact that the card under the punch head advances one column just before the punching operation itself, the card under the read head 16 is always one column ahead of the card under the punch head 13.

Let us now consider the verifier adapter, shown at section B in FIG. 2. The adapter comprises a start circuit 50 which has its input 50a selectively coupled to the keyboard common 41 via switch section 19b. Start circuit 50 comprise an amplifier, a relay driver, and a relay, and its output is coupled via output line 50b to the V-contact associated with switch blade 19f to activate the escape magnet 33 when the keyboard common line 41 of the keyboard applies a positive voltage to the start circuit 50 upon depression of any button on the keyboard 14. The adapter further includes a strobe amplifier 51 the input of which is adapted to be selectively coupled to strobe switch 40 via switch blade 19d, and having its output 51a coupled to one input of a keyboard clear driver 52, to one input of an escape magnet driver 53, and to one input of a no/go latch circuit 54.

The adapter further includes a 13-bit comparator 55 selectively coupled at its input 55a to the 13 keyboard interposer control lines 25 (via mode switch section 19a), and selectively coupled at its input 55b to the 12 read head interposer control lines 38 (via mode switch section 19c). The output 55c of the comparator is coupled to one input of the aforementioned keyboard clear driver 52, to one input of the aforementioned escape magnet driver 53, and to one input of the aforementioned no/go latch circuit 54.

As will appear hereinafter, comparator 55 operates to compare signals present at its inputs 55a and 55b. If an error is detected, the output appearing at 55c sets the no/go latch circuit 54; and this in turn energizes the error lamp 22 and feeds a signal into a decode 3 error counter 56. Error counter 56 includes an output line 56a which is connected to an error clear circuit 57 and to an error skip circuit 58. Error clear circuit 57 includes the aforementioned reset button 23 which, as will appear, operates to clear the no/go latch circuit 54, which also supplies inputs to the keyboard clear driver 52 and so that a comparison can be attempted again on the same column of the card. After three no/go's have occurred on a single column, the error counter 56 decodes a count of three and sends this signal via line 56a to the error clear circuit 57 as well as to the error skip circuit 58. This output signal from counter 56, when it occurs, disables the error clear circuit 57 so that depression of the error reset button 23 does not reset no/go circuit 54 or release the keyboard. The output signal from counter 56 simultaneously enables error skip circuit 58; and when the error skip button 24 is now depressed, it not only clears the no/go latch circuit 54 to restore the keyboard, but also actuates the escape magnet driver 53 to allow the card being verified to advance under read head 16 to the next column. An output 53a from the escape magnet driver 53 clears the error counter 56 so that it will always read zero until an error is detected.

Considering now the interaction of the conventional punch and its added verifier adapter in greater detail, let us assume that the mode switch 19 has been placed in its verify position. Movement of the several switch blades 19a—19g to their V-positions disconnects the 13 keyboard interposer magnet control lines 25 from the interposer magnets 26, and also disconnects the 12 read head interposer magnet control lines 38 from said interposer magnets 26. These 25 lines are now routed via mode switch sections 19a and 19c, to the comparator 55 of the verifier adapter where signals on the 12 read head lines (comparator input 55b) are compared with signals on the 13 keyboard lines (comparator input 55a). The 13th keyboard line is the space interposer, and it must be compared with the logical "or" of all 12 lines from read head 16 since space does not cause any holes to be punched in the cards.

In addition to feeding the aforementioned signals to the inputs of comparator 55, the breaking of the aforementioned 25 lines at switch section 19a and 19c disables the interposer magnets 26 so that no punching can occur when the equipment is in its verifier mode. Since the interposer magnets 26 are disabled, the interposer bail contact 32 cannot be energized to start any punching action. Accordingly, mode switch 19 is provided with sections 19b, 19d, 19e, 19f, and 19g operative to break into appropriate ones of the control lines in the punch, and to route these lines to the verifier adapter unit so as to permit the machine to operate in its desired fashion.

When the equipment is in its verifier mode, the overall equipment operates in the following manner. Depressing any key on the keyboard 14 applies a voltage to the keyboard common line 41, and also grounds a unique set of keyboard interposer magnet control lines 25. This fires the start circuit 50 of the verifier adapter and also locks up the keyboard. Start circuit 50 energizes the escape interlock 35 via start circuit output **50*b* and mode switch section 19*f*, and this in turn engages the punch clutch driver 31. Punch clutch driver 31 now causes the punch clutch 29 to engage, and causes the punch shaft 30** to rotate.

When punch shaft 30 rotates, it causes the strobe cam 39 to engage the duplicate read head 16 to read a card placed under that head, and also causes the strobe switch 40 to close. When the read head 16 is engaged, the 12 read head interposer control lines 38 apply signals to the verifier adapter comparator 55 for comparison with signals present on the 13th interposer control lines 25 from the keyboard 14.

The output **55*c* from comparator 55 is coupled, as mentioned previously, to the keyboard clear driver 52, to the escape magnet driver 53, and to the no/go latch circuit 54. Each of these circuits 52, 53, and 54 is also enabled selectively by output 51*a* from strobe amplifier 51. If the output signal from comparator 55 indicates that there has been a true comparison at the strobe time, both the keyboard clear driver 52 and the escape magnet driver 53 are energized. Output 52*a* from the keyboard clear driver 52 is coupled via mode switch section 19*g* to the keyboard restore solenoid driver 37 to activate said driver 37 which in turn engages the keyboard restore solenoid 36 to unlock the keyboard. Output 53*b* from escape magnet driver 53 is coupled via mode switch section 19*e* to escape magnet 33, which in turn energizes the escape mechanism 34** to cause the card being read to move one column so that the card is now ready for a new comparison.

If the output of the comparator 55 indicates a noncomparison at the strobe time, the keyboard clear driver 52 and the escape magnet driver 53 are not energized and, instead, a signal is applied to the no/go latch circuit 54. An output from circuit 54 is supplied via line **54*a* to energize error lamp 22, and is supplied via line 54*b* to the input of counter 56 to register a no-comparison operation. Since the keyboard clear driver 52 and the escape magnet driver 53 are not energized, the card does not move and the keyboard 14 remains locked up. When this happens, the error reset button 23 can be depressed to energize error clear circuit 57; and an output is supplied from circuit 57 via line 57*a* to clear the no/go latch circuit 54, and is supplied via line 57*b* to the input of the keyboard clear driver 52 to unlock the keyboard 14** in the manner already described.

After the error reset button 23 has been depressed, and the keyboard has been unlocked in the manner described, the operator can try the same comparison once more. If, on the second try, a comparison is made, the normal verify sequence is carried out once more. The comparator output signal at **55*c* energizes escape magnet driver 53, which in turn supplies a signal via line 53*a* to clear the error counter 56, and a signal via line 53*b*** to advance the card one column.

On the other hand, if after e.g. three attempts at a verification, no comparison has been made, a series of three counts will have been supplied to counter 56 producing an output signal on line **56*a*. This output from counter 56 disables the error clear circuit 57 and, at the same time, enables the error skip circuit 58. Disabling of circuit 57 assures that the keyboard 14 can no longer be released by depression of reset button 23. However, the enabling of circuit 58 permits the operator to now free the equipment by depression of the error skip button 24. Depression of button 24 supplies a signal via line 58*a* to clear the no/go latch circuit 54 and, at the same time, supplies inputs to the driver circuits 52 and 53 to energize the keyboard clear driver and the escape magnet driver. Energization of the two driver circuits 52 and 53** clears the keyboard and also causes the card to advance one column so that a new column can now be compared.

It should be noted that there is one major difference in the sequence of operation between the punch and verify modes, i.e., in the punch mode, the card advances before the punching occurs, while in the verify mode the card advances after a verify operation. This difference allows the equipment to attempt three verifications on the same column in any case where an error has taken place.

While FIG. 2 shows the various mode switch sections **19*a*—19*g*** as being disposed adjacent the card punch portion of the overall equipment, this particular representation has been selected for convenience only. The mode switch sections actually form a portion of the verifier adapter itself. In order to convert the standard card punch to a composite card punch and verifier machine, the conventional wiring in the punch is interrupted to bring out the sequence control relays, the keyboard control lines to the interposer magnets, and the read head control lines to the interposer magnets, these lines being brought out to a male and female pair of 36 pin connectors. These connectors plug into the punched card verifier adapter when it is used; but if, for any reason, the card punch should fail, the connectors can be removed from the punched card verifier adapter and mated together to return the card punch to the same electrical configuration that existed without the connectors so that the equipment manufacturer can service the card punch itself.

When the punched card verifier adapter is employed, the 72 lines from the card punch are connected to a 36 pole two-position switch comprising the mode switch 19. In the punch position of the mode switch, the 72 wires are connected together the same as if the two connectors were mated together. In the verify position, however, the 72 lines are routed into the verifier logic and verifier control circuits in the manner already described. Control of the punch in the verify mode is, as described, achieved by breaking the punch lines which normally control the grids of the control tubes for the keyboard restore, escape interlock, and escape magnet portions of the original system; and once these particular control lines are broken, the control circuits already described, and forming a portion of the verifier adapter, are inserted into the control lines.

The circuits forming the verifier adapter (section B of FIG. 2) can take various forms, in accordance with the logic already described. Strobe amplifier 51 preferably comprises an amplifier inverter which converts closure of the strobe switch 40 to a positive pulse. The start circuit 51 has been described previously. Comparator 55 preferably comprises a 13-bit comparator composed of 13 exclusive OR circuits whose outputs are OR'ed together to give an error signal; and the comparator 55 also contains a 12 wide OR of all the duplicate read head control lines which is compared against the space interposer magnet control lines from the keyboard.

No/go latch circuit 54 comprises a circuit which is set if the output of the comparator 55 is low at the time that the strobe cam comes true. The equation for this particular logic function is: $\overline{\text{compare}} \cdot \text{strobe} = \text{error}$. The clear equation of the no/go latch 54 is: $\overline{\text{error}} = \text{error clear} + \text{error skip}$. The escape magnet driver 53 preferably comprises a plurality of transistorized stages and two-pole single throw relay. The equation for energizing the relay is: $\text{energization} = \text{compare} \cdot \text{strobe} + \text{error skip}$. Keyboard clear driver 52 also comprises a series of transistorized stages and a single pole relay; and the equation for energizing the relay is: $\text{energization} = \text{strobe} \cdot \text{compare} + \text{error clear} + \text{error skip}$. The decode 3 error counter 56 preferably comprises a two-stage Johnson counter with a gated clock. The equation for the gated clock is: $\text{clock} = \text{error} \cdot \overline{\text{decode 3}}$. The decode 3 counter is cleared by closure of the relay forming a portion of the escape magnet driver 53, as described previously. The error clear circuit comprises a transistorized circuit cooperating with error reset button 23; and the equation for the circuit 57 is: $\text{error clear} = \text{error reset button} \cdot \overline{\text{decode 3}}$. The error skip circuit 58 again comprises a transistorized circuit and the error skip button 24; and its equation is: $\text{error skip} = \text{error skip button} \cdot \text{decode 3}$.

It should be noted that the particular circuit representation shown in FIG. 2, including the segregation of components into Section A and Section B of that figure, can be modified without departing from the principles described. In an actual commercial embodiment of the invention, the punched card verifier adapter is broken into two units for ease of production and usage. One of these units comprises a control unit and contains the error light 22, the error reset button 23, and the mode switch 19; and the mode switch itself, rather than taking the form of a 36 pole, two-position switch, takes the form of a single pole, two-position switch which is used to control six, six pole, two-position relays. The other unit contains all the rest of the logic as well as the six, six pole relays; and this second unit is actually mounted inside of the card punch cabinet. By this type of element segregation, the control unit alone is quite small and can be placed on the reading board 15 directly next to the keyboard 14, while still leaving sufficient space on board 15 for data records. Other changes can also be made, including the use of solid state switches etc. in place of the switching components actually shown and described herein.

Having thus described my invention, I claim:

1. A punched card verifier adapter for converting a card punch for use as a punched card verifier, wherein said card punch includes a punch head, a keyboard, first circuit means coupling keyboard signals from said keyboard to control operation of said punch head, a duplicate read head, second circuit means coupling read head signals from said duplicate read head to control operation of said punch head, and card-feeding means for selectively advancing a card past said punch head and past said read head; said adapter comprising a multibit comparator, first switch means for disabling the first circuit means of said punch to prevent said keyboard signals from controlling operation of said punch head, said first switching means including means for coupling said keyboard signals to a first input of said comparator, second switch means for disabling the second circuit means of said punch to prevent said read head signals from controlling operation of said punch head, said second switch means including means for coupling said read head signals to a second input of said comparator, error means coupled to the output of said comparator for producing an indication of error in response to a lack of true comparison of the signals applied respectively to said first and second comparator inputs, said comparator including means responsive to the signals supplied to its first and second inputs for producing a first output signal in response to a true comparison of said input signals and for producing a second output signal, different from said first signal, in response to a lack of comparison of said input signals, said error means being nonresponsive to said first output signal and being responsive only to occurrence of said second output signal for producing said error indication, and means responsive to occurrence of said first output signal, and nonresponsive to said second output signal, for energizing the card-feeding means of said punch.

2. The adapter of claim 1 wherein said last-named means comprises driver means in said adapter, said adapter including means for connecting the output of said driver means to the card-feeding means of said punch.

3. The verifier adapter of claim 1 wherein said error means comprises a lamp.

4. The verifier adapter of claim 1 wherein said error means comprises means for locking the keyboard of said card punch.

5. The verifier adapter of claim 1 wherein said adapter includes counter means coupled to said comparator for counting the number of times a lack of true comparison has occurred, and means responsive to occurrence of said first output signal for clearing said counter means.

6. The verifier adapter of claim 5 including manually operable reset means for clearing said error means each time it produces an indication of error, and means responsive to accumulation of a predetermined count by said counter means for disabling said reset means.

7. The verifier adapter of claim 6 including normally disabled manually operable error skip means, means responsive to accumulation of said predetermined count by said counter means for enabling said error skip means, and means responsive to manual operation of said enabled error skip means for energizing the card-feeding means of said punch.

8. The verifier adapter of claim 7 wherein said error means includes means for locking the keyboard of said card punch, and means responsive to operation of said enabled error skip means for unlocking said keyboard.

9. The verifier of claim 1 wherein said card punch includes a plurality of interposer magnets, said first circuit means in said punch comprising a first plurality of interposer magnet control lines normally coupling said keyboard to said plurality of interposer magnets, and said second circuit means in said punch comprising a second plurality of interposer magnet control lines normally coupling said read head to said interposer magnets; said first and second switch means comprising movable means selectively operative to interrupt all of said first and second plurality of interposer magnet control lines at positions between said interposer magnets and said keyboard and read head, respectively, and simultaneously operative to couple said first plurality of interposer control lines from said keyboard to one of said comparator inputs and operative to couple said second plurality of interposer control lines from said read head to the other of said comparator inputs.